Patented Sept. 16, 1952

2,610,966

UNITED STATES PATENT OFFICE 2,610,966

PROCESS FOR TREATING TALL OIL WITH ALKYLENE OXIDES

Vito Esposito, Haddon Heights, N. J., assignor to R. M. Hollingshead Corporation, Camden, N. J., a corporation of New Jersey No Drawing. Application October 17, 1949, Serial No. 121,900

9 Claims. (Cl. 260—97.5)

This invention relates to improvements in a process for reacting tall oil with alkylene oxide and particularly to a controlled process for reacting tall oil with ethylene oxide or propylene oxide.

I have found that valuable products are obtained by reacting alkylene oxides such as ethylene oxide and propylene oxide with tall oil. While the exact nature of the reaction and the exact composition of the resulting products are not known, it has been established that uniformity in the final product and optimum control of the reaction process are dependent upon carefully limited conditions of temperature, pressure and amounts of reactive material.

The principal object of the present invention is to provide a controlled process for producing a uniform product through the reaction of an alkylene oxide and tall oil.

In carrying out the process of the present invention the tall oil is preferably subjected to a preliminary purification step adapted to eliminate sterols and other non-saponifiable constituents normally present in tall oil. The purified tall oil is then heated to about 400° F. in a suitable reaction chamber. An alkylene oxide such as ethylene oxide or propylene oxide is then gradually added under pressure to the purified and heated tall oil. For optimum results the total amount of alkylene oxide employed in the reaction should be substantially 16 mols alkylene oxide per mole of purified tall oil but may be from 14 to 18 moles alkylene oxide per mole of purified tall oil. The temperature of the tall oil should be maintained at about 400° F. until about half of the alkylene oxide has been added and then raised to about 600° F. and maintained at this temperature during the addition of the balance of alkylene oxide and until the reaction has gone to substantial completion. While these temperature values are preferred, the initial temperature may be in the range from 350° F. to 450° F. and the temperature for the second half of the reaction may be in the range from 550° F. to 650° F. The pressure should be allowed to increase to substantially 2200 pounds per square inch as the reaction proceeds and should be maintained at this value during the first half of the reaction after which the pressure should be increased to substantially 3000 pounds per square inch and maintained at this value during the second half of the reaction. The above pressure values provide optimum results but the pressure for the first half of the reaction may be in the range from about 2000 pounds per square inch to about 2400 pounds per square inch and the pressure for the second half of the reaction may be in the range from about 2800 pounds per square inch to about 3200 pounds per square inch. After the reaction has gone substantially to completion, the pressure is reduced and the reaction mixture is allowed to stand. Charcoal is then added and the mixture is filtered. Any excess alkylene oxide is removed by heating and agitating the filtrate.

The following example is given to provide a detailed description of a preferred embodiment of the process of the present invention as applied to the treatment of tall oil with ethylene oxide.

Example I

A quantity of tall oil is first purified by treating with maleic acid at about 260° F. for about 90 minutes and filtering off the precipitate. The amount of maleic acid employed may be about 1 part by weight to 100 parts by weight of tall oil. 284 parts by weight of the tall oil thus purified are then heated to 400° F. and placed in a high pressure reaction vessel with a high pressure gas inlet at the bottom and a pressure indicating gauge at the top. The entire pressure vessel and its contents are maintained at about 400° F. by circulating steam or other heating fluid through an external jacket. A gas cylinder containing ethylene oxide at a pressure of about 3000 pounds per square inch is placed on an indicating scale and connected to the gas inlet of the pressure vessel and the vessel is then sealed. Ethylene oxide is gradually admitted to the vessel until a pressure of about 2200 pounds per square inch is attained inside the reaction vessel. As the reaction proceeds, the gaseous ethylene oxide enters the liquid phase and the gas pressure tends gradually to decrease. The rate of addition of ethylene oxide is therefore adjusted to maintain a substantially constant pressure of 2200 pounds per square inch inside the reaction vessel. The addition of ethylene oxide is continued in this manner until the scale reading indicates that about 353 parts by weight of ethylene oxide have been introduced. During this entire period the temperature within the pressure vessel is maintained at about 400° F. The temperature within the pressure vessel is then raised to about 600° F. and the valve in the ethylene oxide supply line is adjusted to deliver additional ethylene oxide to the pressure vessel at the cylinder pressure of about 3000 pounds per square inch. Addition of ethylene oxide at this elevated temperature and pressure is continued until the scale reading shows that an additional 353 parts by weight of ethylene oxide have been delivered. The ethylene oxide supply valve is then closed and the pressure within the vessel is gradually relieved by allowing the reaction to proceed further without adding ethylene oxide. After the pressure within the vessel has dropped to about atmospheric pressure, the vessel is opened and the reaction mixture is allowed to cool to about room temperature. A few parts by weight of decolorizing charcoal is then added and the mixture is stirred and filtered. The clear filtrate is heated to about 150° F. and agitated to drive off substantially all unreacted ethylene oxide.

The reaction product obtained is in the form of a clear liquid which has physical and chemical properties, making it very useful as a component in hydraulic fluid compositions. Other uses for the composition will be apparent to those skilled in the general art to which this composition pertains.

Having thus described my invention, I claim:

1. In a process for preparing an improved product from tall oil the steps comprising removing sterol and other unsaponifiable material from tall oil, heating the purified tall oil to a temperature in the range between 350° F. to 450° F., gradually adding an alkylene oxide to said purified tall oil while maintaining the temperature in said range and while maintaining the pressure in the range between 2000 pounds per square inch and 2400 pounds per square inch, increasing the temperature stepwise to the range between 550° F. to 650° F. and increasing the pressure stepwise to the range between 2800 pounds per square inch and 3200 pounds per square inch, and adding additional alkylene oxide.

2. The invention of claim 1 further characterized by the fact that the step of removing the sterol and other unsaponifiable material is carried out by heating the tall oil with maleic acid.

3. The invention of claim 1 further characterized by the fact that the alkylene oxide is ethylene oxide.

4. The invention of claim 1 further characterized by the fact that the alkylene oxide is propylene oxide.

5. In a process for preparing an improved reaction product of tall oil and alkylene oxide the steps comprising heating purified tall oil to a temperature in the range between 350° F. to 450° F., gradually adding alkylene oxide in an amount corresponding to about 8 moles alkylene oxide per mole of purified tall oil while raising and maintaining the pressure to the range between 2000 pounds per square inch and 2400 pounds per square inch, raising the temperature to the range between 550° F. and 650° F. and adding about 8 moles alkylene oxide per mole of purified tall oil while maintaining the pressure in the range between 2800 to 3200 pounds per square inch.

6. The invention of claim 5 further characterized by the fact that the alkylene oxide is ethylene oxide.

7. The invention of claim 5 further characterized by the fact that the alkylene oxide is propylene oxide.

8. In a process for preparing an improved reaction product of tall oil and alkylene oxide, the steps comprising heating tall oil to a temperature of about 260° F., mixing the tall oil with maleic acid in a proportion of about 100 parts tall oil to one part maleic acid, filtering off the resulting precipitate, heating the tall oil filtrate thus obtained to a temperature of about 400° F., placing the heated tall oil in a pressure vessel, introducing ethylene oxide under pressure into said vessel, gradually increasing the pressure therein until a pressure of about 2000 pounds per square inch is attained, continuing the addition of ethylene oxide until an amount corresponding to about 8 mols ethylene oxide per mol tall oil has been added, raising the temperature in the pressure vessel to about 600° F., adding ethylene oxide and gradually increasing the pressure in the vessel to about 3000 pounds per square inch, and continuing the addition of ethylene oxide until an additional amount corresponding to about 8 mols ethylene oxide per mol tall oil has been added.

9. In a process for preparing an improved reaction product from tall oil and about 14–18 mols alkylene oxide per mol tall oil, the steps comprising heating said tall oil to a temperature of about 350–450° F., adding alkylene oxide in an amount equal to about half the total while the reaction pressure is in the range of about 2000–2400 pounds per square inch, raising the temperature to about 550–650° F., and adding the remainder of the alkylene oxide while maintaining the pressure in the range of about 2800–3200 pounds per square inch.

VITO ESPOSITO.

REFERENCES CITED

The following references are of record in the file of this patent:

UNITED STATES PATENTS

| Number | Name | Date |
|---|---|---|
| 2,270,947 | Hough | Jan. 27, 1942 |
| 2,469,493 | Barker | May 10, 1949 |

FOREIGN PATENTS

| Number | Country | Date |
|---|---|---|
| 467,571 | Great Britain | June 16, 1937 |